INVENTOR
ARTHUR E. KITTREDGE
BY
ATTORNEYS

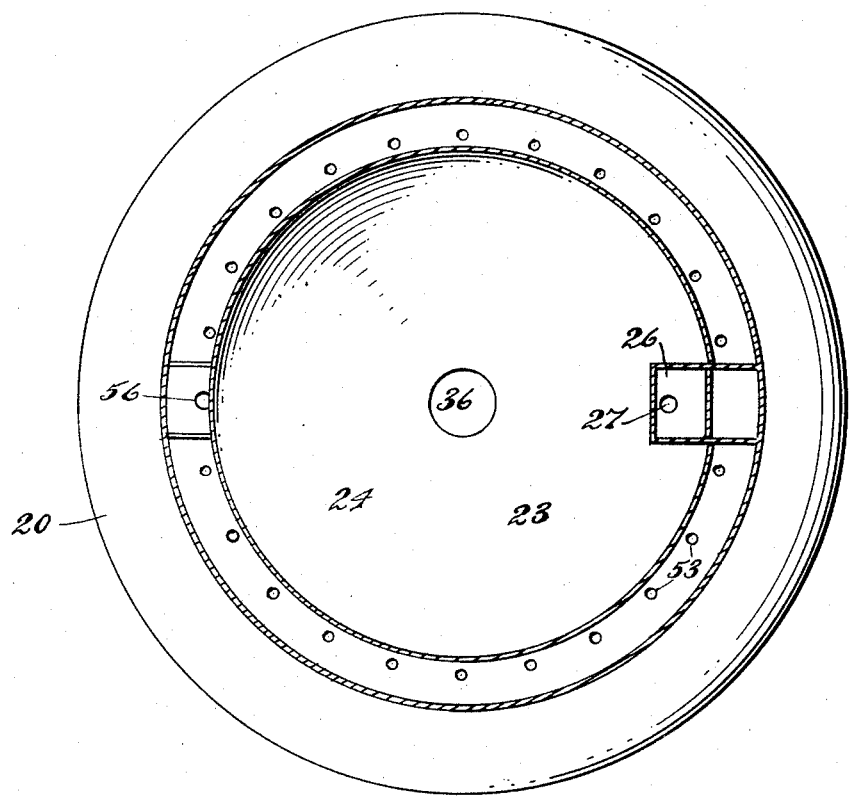

United States Patent Office 2,860,786
Patented Nov. 18, 1958

2,860,786
HOT PROCESS SOFTENER

Arthur E. Kittredge, Audubon, N. J.

Application August 8, 1955, Serial No. 527,069

2 Claims. (Cl. 210—196)

The present invention relates to hot process water softener systems particularly of the character which are used to purify boiler water and water employed for other purposes, including removing impurities by chemical reaction, with or without deaeration and degasification.

A purpose of the invention is to provide a backwash storage compartment in a hot process water softener which will provide minimum interference with the space required for sludge separation.

A further purpose is to provide a backwash storage compartment in a hot process water softener which will be self-cleaning and located within the sedimentation tank, but which will deliver its dirty backwash residue below the sludge level, and at a point which will not tend to complicate sedimentation.

A further purpose is to restore the backwash water after it has been used for backwash purposes in the filter to the backwash water storage compartment at a radially inner position so that the returning backwash water will be distributed upwardly through an expanding cross sectional area, gently slowing down the flow and preventing admixture of the dirty backwash water which has just been used with the clear water which is being drawn out for backwash purposes.

A further purpose is to provide a backwash storage compartment having downwardly converging conical top and bottom walls concentric with the sedimentation tank and desirably located immediately below the primary mixing and reaction chamber.

Further purposes appear in the specification and in the claims.

In the drawings, I have chosen to illustrate only one of the numerous embodiments in which my invention may appear, selecting the form shown from the standpoints of convenience in illustration, satisfactory operation and clear demonstration of the principles involved.

Figure 2 is a section on the line 2—2 of Figure 1.

Figure 1:
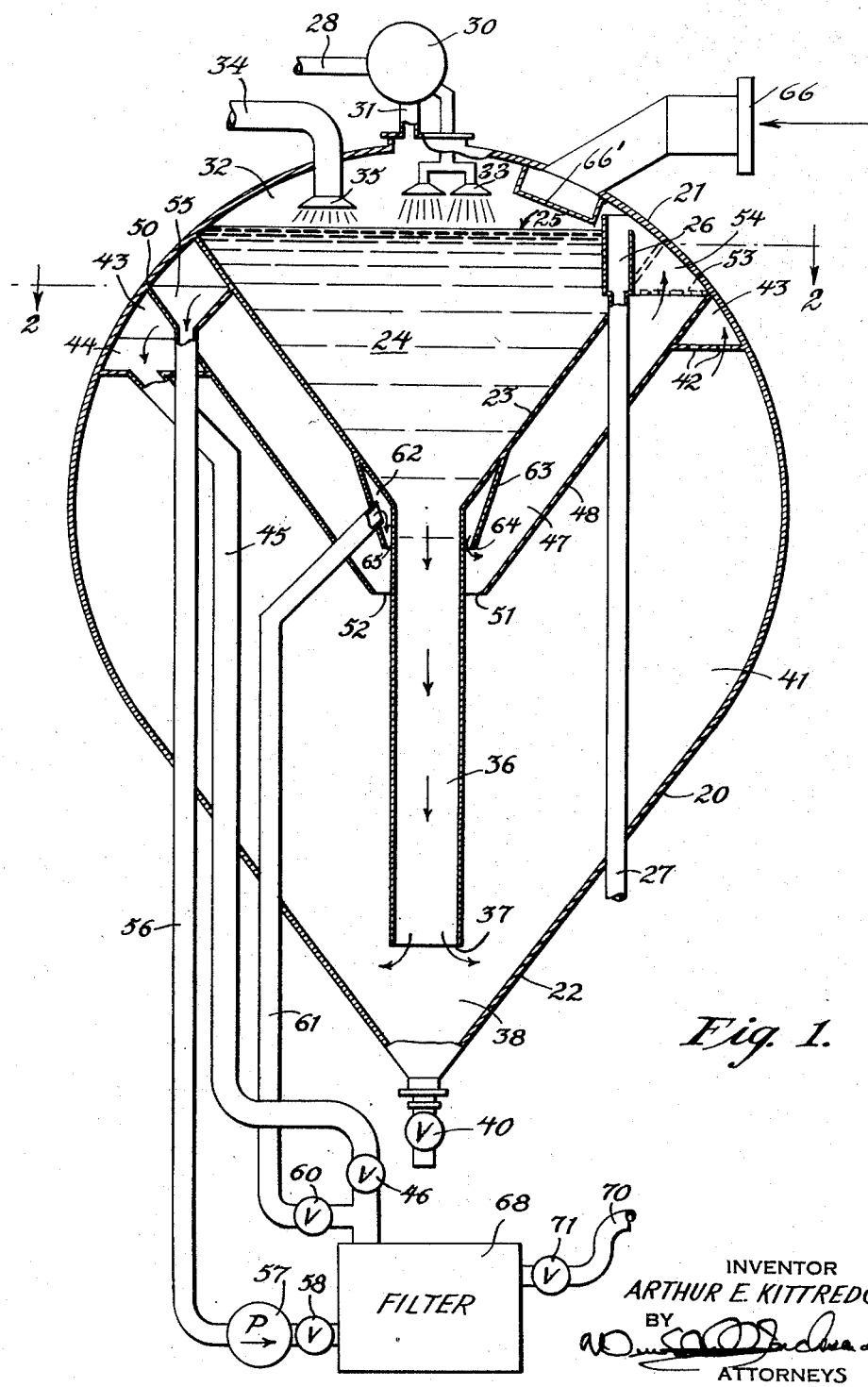
Figure 1 is a diagrammatic central vertical section of the hot process water softener system in accordance with the invention.

Describing in illustration but not in limitation and referring to the drawings:

Hot process water softeners are extensively used in purifying boiler feed water, and water required for industrial and other purposes. They are commonly of two general types. In one type, there is downflow with a central uptake funnel common in conventional practice. In another type, which is illustrated by the embodiment described herein more in detail, the treated water and sediment flows downward through a downcomer and the treated water then is carried upward around the downcomer into a purified water compartment. This type of hot process water softener is generally known as the sludge blanket or upflow type.

In either of these devices, there must be adequate volume for sedimentation, adequate sludge separating area, and proper provision for backwashing all filters.

In recent years there has been a tendency to relieve the sedimentation tank from the shock which occurs when dirty backwash water from backwashing of filters is returned directly to the sedimentation tank. Instead the modern practice is to provide backwash storage compartments which contain an adequate supply of clean water for backwashing and which receive the dirty backwash water from backwashing.

In one type of backwash storage compartment, known as the double unit volume type, there are two separate tanks or a divided tank so that backwash water is withdrawn from one tank and discharged into the other. After completing the backwash cycle, the dirty backwash water is collected in one of the tanks and then allowed to flow slowly into the main sedimentation tank. The empty compartment is then slowly filled up with settled or filtered water so that when the next backwash cycle is encountered, the operator has one empty backwash storage tank to receive the dirty water and one backwash storage tank full of clear water. This system accomplishes the settling and clarification of the dirty backwash water in the main sedimentation tank, and avoids any marked increase in load by applying the load on the backwash sedimentation tank gradually instead of abruptly.

The double unit system requires storage volume equal to twice the backwash volume.

Single unit volume backwash storage systems are also used. In this case the tank contains sufficient water to backwash all filters once and it is arranged so that the tank is always full of water. Clear water is drawn off from the top of the backwash storage tank and dirty water is returned to the bottom in such a way that one backwash operation of all the filters displaces the clear water and leaves the backwash storage compartment with dirty water. The dirty sludge is then allowed to settle and may be blown down from the backwash storage compartment before the next backwash operation.

The present invention is concerned with a single unit volume type backwash storage compartment which is designed and located most favorably for use in an upflow sludge blanket hot process water softener. The direct return of backwash is very objectionable in softeners of this character because the rapid change in clarification rate expands the sludge bed and causes carry-over of sludge with the treated water.

In accordance with the invention a single unit volume backwash storage compartment serves very advantageously indeed in an upflow sludge blanket hot process water softener.

Application of a single unit volume backwash tank in a conventional downflow hot process water softener has already been made in Sebald, U. S. Patent 2,379,753, granted July 3, 1945, for Water Purifying and Degasifying Apparatus.

The backwash storage compartment in the present invention provides minimum interference with the sludge separating area of the treating tank, so that the treating tank can take substantially a normal form without serious interference.

Furthermore, in accordance with the invention, the dirty backwash residue is restored at a point below the sludge bed, where it will not interfere with normal sedimentation operations. The backwash water storage compartment is entirely self-cleaning.

One of the important aspects of the present invention is that there is substantially non-turbulent return of backwash water to the backwash storage compartment, the dirty backwash water entering a uniformly expanding cross section and flowing gently upwardly, thus maintaining a sharp line of demarcation between the returning dirty water and the clear water above, which is being withdrawn for backwashing.

In accordance with the preferred embodiment, a central conical primary mixing and reaction chamber is provided, and a concentric conical backwash storage compartment is provided immediately below the same Referring now to the drawings in detail: An upflow sludge blanket hot process water softener is shown having a sedimentation tank 20 which is symmetrical except for the features particularly brought out in Figure 2, comprising a generally dome-shaped top 21 and an inverted concentric conical bottom 22.

Extending concentrically from the dome-shaped top there is a downwardly converging conical wall 23 which forms a primary mixing and reaction chamber 24 in which the reaction occurs.

The working line 25 shows the top of the water level, and in case an abnormal level is maintained overflow occurs into a drain box 26 connected to an overflow pipe 27 extending to a suitable sump.

Raw water inlet is accomplished in any suitable manner, desirably through pipe 28 to a vent condenser 30 which has a venting connection 31 to steam space 32 above the water level, and raw water is introduced to the tank through spray heads 33 connected to the vent condenser as well known.

Chemical is introduced through chemical feed line 34 to spray heads 35 suitably above the water level, only one of which is shown.

Precipitation occurs in the downwardly converging primary mixing and reaction chamber 24, the precipitate and the treated water pass down through vertical concentric downwardly extending downcomer 36 which connects at the top with the bottom of the primary mixing and reaction chamber 24 and discharges at 37 into the bottom of the upflow sedimentation and sludge filtration section 41 formed around the downcomer by the lower inverted conical portion 22 of the sedimentation tank, hence through orifice 42 to a treated water outlet compartment 43 which connects with an outlet box 44 to a treated water outlet pipe 45 controlled by a valve 46.

Between the downwardly converging conical wall 23 and the treated water storage compartment 41 there is an annular downnwardly converging conical backwash compartment 47 which is formed between the wall 23 above and a symmetrical displaced downwardly converging conical wall 48 which extends at the top at 50 to the dome 21 of the tank and at the bottom terminates at 51 substantially outside the downcomer so as to leave a sedimentation passage 52 around the downcomer to clear the dirty backwash water from the dirt and sludge.

The conical wall 48 separates the treated water outlet compartment 43 from the backwash water.

At the top the backwash storage compartment 47 has a perforated wall 53 which communicates with a backwash outlet compartment 54 located between the wall 23 and the outer dome 21. The compartment 54 communicates with the backwash outlet box 55 which connects by a pipe 56 to the intake of pump 57 and then by valve 58 with each filter to which backwash is to be applied. The dirty backwash water returning from each filter is carried through valve 60 and pipe 61 to a backwash return compartment 62 which is formed between the conical wall 23 and the downcomer near where they join, and an outer symmetrical downwardly converging conical wall 63 which connects with the conical wall 23 at the top and which terminates at the bottom at 64 substantially outside the downcomer so as to leave a downflow passage 65 into the backwash storage compartment near the bottom and adjacent to the radial inside.

Steam is introduced into the system through pipe 66 near the top of the treated water storage compartment. Pipe 66 has a baffled inlet 66'.

In operation, the sludge forms and precipitates in the usual manner. During all the time that this action occurs, the backwash storage compartment is full of dirty backwash water which slowly is cleaned by sedimentation, the dirt and sludge flowing downward through opening 52 and eventually depositing with the other sludge at 38 in the bottom of the sedimentation tank.

When the time arrives for backwashing filter 68, valves 46 and 71 are closed, pump 57 is operated, and normally closed valves 58 and 60 are opened. Backwash water is withdrawn from the top of the backwash storage compartment 47 and forced in reverse direction through the filter, the dirty backwash water then being taken by pipe 61 to backwash return compartment 62, and caused to flow through annular port 65 at the bottom of the backwash storage compartment. Since backwash water is being taken out continuously from the top of the backwash storage compartment, this return backwash water flows out and radially upward in the backwash storage compartment, but as it flows upward the cross section increases and therefore the velocity of the return backwash water decreases, so that a sharp line of demarcation will be maintained between the dirty backwash water and the clear backwash water and there will be no tendency to churn up the entire contents of the backwash storage compartment. This lack of turbulence is very important in maintaining efficiency in backwash.

As soon as the backwash operation is complete and the backwashing is stopped, stopping pump 57, closing valves 58 and 60 and restoring service operation by opening valves 46 and 71, sedimentation of the dirty backwash water occurs. This does not interfere in the least with sedimentation in the primary mixing and reaction chamber and no increased load is thrown on the primary mixing and reaction chamber. The residue from the backwash enters the treated water storage compartment through passage 52 which is entirely outside the downcomer and below the sludge bed level. The self-cleaning feature of the backwash storage compartment therefore does not harmfully influence the main sedimentation procedure.

In view of my invention and disclosure variations and modifications to meet individual whim or particular need will doubtless become evident to others skilled in the art, to obtain all or part of the benefits of my invention, without copying the process and structure shown, and I, therefore, claim all such insofar as they fall within the reasonable spirit and scope of my claims.

Having thus described my invention, what I claim as new and desire to secure by Letters Patent is:

1. In a hot process water softener, an outer casing having downwardly converging conical walls, downwardly converging conical walls coaxial with the casing near the top thereof and defining a primary mixing and reaction chamber, a downcomer at the center of the casing extending vertically downward from the bottom of the primary mixing and reaction chamber and terminating adjacent to and above the bottom of the casing, a further downwardly converging conical wall in the casing spaced below and generally in conformity with the wall defining the bottom of the primary mixing and reaction chamber, opened at the bottom around the downcomer and with the downcomer, and the downwardly converging wall defining the primary mixing and reaction chamber, forming a backwash storage compartment immediately below the primary mixing and reaction chamber, the further downwardly converging conical wall and the casing defining a sludge filtration compartment beneath the downwash storage compartment.

2. In a hot process water softener, an outer casing having downwardly converging conical walls, walls forming a downward converging primary mixing and reaction chamber in the upper part of the casing, a downcomer from the bottom of the primary mixing and reaction chamber, extending downward and terminating adjacent the bottom of the softener, the space between the downwardly converging outer casing and the downcomer forming a downwardly converging sludge filtration compartment, compartment walls surrounding the walls forming the downwardly converging primary mixing and reaction chamber in spaced relation thereto, and themselves converging downwardly and inwardly and forming a backwash storage compartment open at the bottom adjacent to the downcomer into the sludge filtration compartment, connections for drawing backwash water from the radial outside of the backwash storage compartment for filter backwashing, connections for returning dirty filter backwash water to the radial inner position of the backwash storage compartment and walls forming a downward converging backwash return compartment surrounding the downcomer at the upper portion of the inner part of the backwash storage compartment, communicating with the connections for returning dirty filter backwash water and open at the bottom to return the dirty backwash water to the backwash storage compartment.

References Cited in the file of this patent

UNITED STATES PATENTS

| | | |
|---|---|---|
| 2,347,318 | Gurney | Apr. 25, 1944 |
| 2,523,523 | Robinson et al. | Sept. 26, 1950 |
| 2,772,235 | Bookout et al. | Nov. 27, 1956 |